United States Patent [19]

Worley et al.

[11] 3,873,535

[45] Mar. 25, 1975

[54] 2-SUBSTITUTED-3,4-DIHYDRO-3-OXO-2H-1,4-BENZOTHIAZINE-4-ACETIC ACID AND ESTERS THEREOF

[75] Inventors: Jimmy Weldon Worley; Kenneth Wayne Ratts, both of Creve Coeur, Mo.

[73] Assignee: Monsanto Company, St. Louis, Mo.

[22] Filed: Feb. 4, 1974

[21] Appl. No.: 439,511

[52] U.S. Cl. ................................. 260/243 R, 71/90
[51] Int. Cl. ............................................ C07d 93/12
[58] Field of Search ............................... 260/243 R

[56] References Cited
OTHER PUBLICATIONS

Coutts, et al., Canadian Journal of Chemistry, Vol. 48, pp. 3727–3732 (1970).

*Primary Examiner*—John M. Ford
*Attorney, Agent, or Firm*—Arnold H. Cole; Donald W. Peterson; Neal E. Willis

[57] ABSTRACT

Certain 2-substituted-3,4-dihydro-3-oxo-2H-1,4-benzothiazine-4-acetic acid and esters thereof have been found to be useful in the treatment of various plants.

10 Claims, No Drawings

2-SUBSTITUTED-3,4-DIHYDRO-3-OXO-2H-1,4-BENZOTHIAZINE-4-ACETIC ACID AND ESTERS THEREOF

2-Substituted-3,4-dihydro-3-oxo-2H-1,4-benzothiazine-4-acetic acid and esters thereof This invention relates to a new class of organic chemical compounds. More particularly, this invention is concerned with novel heterocyclic compounds which can generally be designated as derivatives of 3,4-dihydro-3-oxo-2H-1,4-benzothiazine-4-acetic acid or the esters thereof. The specific derivatives herein are those wherein a phosphonic acid or ester group is substituted at the 2-position of the ring. This class of compounds has been found to display desirable herbicidal activity when applied to certain varieties of weeds. Such compounds also produce certain non-lethal, growth regulating responses when applied to soybeans.

The compounds of the present invention may be represented by the structural formula

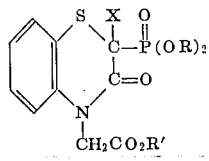

wherein X is hydrogen or chlorine, and R and R' are each independently hydrogen or lower alkyl. As employed herein, the term "lower alkyl" designates the straight and branched chain hydrocarbon radicals having from one to four atoms.

The starting materials employed in the preparation of the compounds of this invention are lower alkyl esters of 2-chloro-3,4-dihydro-3-oxo-2H-1,4-benzothiazine-4-acetic acid (I). The unhalogenated precursors of such esters are prepared by the method shown in Canadian Journal of Chemistry, Vol. 44, pgs. 1247–1258 (1966), and such precursors are treated with one equivalent of a chlorinating agent such as sulfuryl chloride to give the 2-chloro starting materials (I).

In order to prepare the compounds of this invention wherein X is hydrogen, and both R and R' are lower alkyl, the lower alkyl, 2-chloro acetic acid ester starting materials (I) are reacted with tri lower alkyl phosphites. The product of this reaction is a lower alkyl-2-di lower alkoxyphosphinyl-3,4-dihydro-3-oxo-2H-1,4-benzothiazine-4-acetate (II). Treatment of said acetate (II) with hydrobromic acid yields the corresponding di-acid, 3,4-dihydro-2-phosphono-3-oxo-2H-1,4-benzothiazine-4-acetic acid (III), while treatment of said diacid (III) with hydrogen chloride and lower alkanol yields the mixed acid-ester, lower alkyl-3,4-dihydro-2-phosphono-3-oxo-2H-1,4-benzothiazine-4-acetate (IV). Further, treatment of the diester (II) with one equivalent of a chlorinating reagent such as sulfuryl chloride yields the corresponding 2-chloro compound of this invention.

The following illustrative, non-limiting examples will further demonstrate to those skilled in the art the manner in which specific compounds of the invention can be prepared.

EXAMPLE I

A mixture of 40 gm. (0.14 mole) of ethyl 2-chloro-3,4-dihydro-3-oxo-2H-1,4-benzothiazine-4-acetate and 51 gm. (0.31 mole) of triethyl phosphite is refluxed gently for about 28 hours to obtain an amber colored solution. Volatile materials are removed from the solution by heating on a steam bath for 30 minutes at 0.1 Torr. The residue is treated with 20 ml. of warm ethanol, and then with 200 ml. of petroleum ether. Cooling of the solution with Dry Ice gives separation of an oil which crystallizes when it is warmed and scratched with a glass rod. Filtration gives 32 gm. of a tan solid m.p. 65°–68°C. Evaporation of the filtrate and treatment of the residue with petroleum ether gives, after cooling, 18 gm. of a brown solid, m.p. 60°–65°C. Chromatography of 43.0 gms. of the crude material on alumina results in the isolation of 24 gm. of solid. Recrystallization of the total from benzene-petroleum ether yields 18.5 gm. of ethyl 2-diethoxyphosphinyl-3,4-dihydro-3-oxo-2H-1,4-benzothiazine-4-acetate as a white solid, m.p. 73°–75°C. Analysis shows 49.78% carbon, 5.83% hydrogen, 3.63% nitrogen and 8.41% sulfur as against calculated values of 49.61%, 5.72%, 3.62% and 8.28% for $C_{16}H_{22}NO_6PS$.

EXAMPLE II

The procedure of Example I is followed with a mixture of 10 gms. of ethyl 2-chloro-3,4-dihydro-3-oxo-2H-1,4-benzothiazine-4-acetate and 9.5 gm. of trimethyl phosphite. Crops of 3.8 and 6.9 gm. are obtained, and the smaller crop is treated with a boiling mixture of 15 ml. of chloroform and 40 ml. of petroleum ether and filtered. The filtrate is cooled to obtain 1.9 of a white solid, m.p. 109°–110°C. The material which is removed by the filtration prior to cooling is 1.1 gm., m.p. 110°–111°C. Analysis of the product, ethyl 2-dimethoxyphosphinyl-3,4-dihydro-3-oxo-2H-1,4-benzothiazine-4-acetate, shows 46.53% carbon, 5.00% hydrogen and 9.08% sulfur as against calculated values of 46.79%, 5.05% and 8.92% for $C_{14}H_{18}NO_6PS$.

EXAMPLE III

A mixture of 3.9 gms. of the product of Example I and 10 ml. of 48% hydrobromic acid is heated on a steam bath for 30 minutes, after which it is concentrated on a rotary evaporator to approximately one-half volume. Another 10 ml. of the hydrobromic acid is added to the reaction solution, followed by further heating for 45 minutes. Upon cooling, the solution deposits white crystals which are collected by filtration, washed with acetone and then ether, and dried to yield 2.0 gms. of 3,4-dihydro-2-phosphono-3-oxo-2H-1,4-benzothiazine-4-acetic acid, m.p. 230°–232°C. (dec.). Analysis shows 39.73% carbon, 3.36% hydrogen and 10.64% sulfur as against calculated values of 39.61%, 3.32% and 10.57% for $C_{10}H_{10}NO_6PS$.

EXAMPLE IV

A solution of 0.9 ml. of sulfuryl chloride in 10 ml. of methylene chloride is added over 10 minutes to a stirred solution of 3.9 gm. of the product of Example I in 30 ml. of methylene chloride under a nitrogen atmosphere. The solution is stirred for about 17 hours and then concentrated to a pale yellow oil. The material is dissolved in 50 ml. of benzene, and the solution is concentrated to an oil again, after which this procedure is repeated with benzene, and then twice with 50 ml. of petroleum ether. The residue is dissolved in 10 ml. of benzene, and the solution is added to 100 ml. of petroleum ether. A yellow oil which separates is crystallized upon vigorous scratching with a glass rod to give 3.1 gm. of a white solid, m.p. 82°–84°C. Recrystallization of this product from benzene-petroleum ether yields 2.5 gm. of ethyl 2-chloro-2-diethoxyphosphinyl-3,4-dihydro-3-oxo-2H-1,4-benzothiazine-4-acetate, m.p. 82°–83° C. Analysis shows 45.74% carbon, 5.08% hydrogen and 8.26% chlorine as against calculated values of 45.65%, 5.02% and 8.41 % for $C_{16}H_{21}ClNO_6PS$.

In a test to demonstrate the pre-emergent herbicidal activity of various compounds of this invention, a good grade of top soil is placed in an aluminum pan and compacted to a depth of three-eights to one-half inch from the top of the pan. A pre-determined number of seeds of each of several plant species are placed on top of the soil, and the seeds are then covered with added soil which is leveled to the top of the pan. A solution containing the compound to be tested is sprayed on the top layer of soil, after which the pan is placed in a greenhouse and watered as needed. An untreated pan of seeds is prepared in the same manner, and, after a number of days, the number of plants growing in the treated and untreated pans are compared to determine the herbicidal effectiveness of the compound applied.

At a rate of 5 pounds per acre, observations made two weeks after treatment showed 25–74% inhibition of Canada thistle, morning glory, lambsquarter and cocklebur with the compounds of Examples I and II, and the latter compound was similarly effective on velvet leaf. Corresponding results were obtained with the compounds of Examples III and IV except that the inihibition of Canada thistle ranged from 75–100%. Observations of the same plants four weeks after treatment show increased inhibition in many instances with the compounds of Examples I, III and IV, with no reduction of effectiveness on any of these species. It should also be noted that other plant species such as nutsedge, downy brome, barnyard grass and Johnson grass were included in these tests, but no inhibition was observed with any of the test compounds.

As regards the treatment of soybeans to obtain certain non-lethal, growth regulating responses, tests were conducted by applying the compounds of Examples I through IV at various rates from 0.5 to 12.0 pounds per acre. The plants employed in these tests are grown from seeds in aluminum pans, and treatments are applied to soybean plants from 1 to 6 weeks old. The most commonly observed responses were leaf alteration or distortion, axillary bud development and inhibition of apical development. Various other responses including early pod set and thick leaf texture were also noted, but with lesser frequency.

While the invention has been described herein with regard to certain representative examples for purpose of illustrating its practice, it is not to be construed as limited thereto. Those skilled in the art will readily recognize the variations and modifications which can be made without departing from the spirit and scope of this invention.

What is claimed is:

1. A compound of the formula

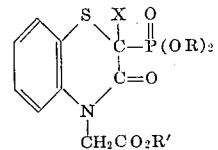

wherein X is hydrogen or chlorine, and R and R' are each independently hydrogen or lower alkyl.

2. A compound as defined in claim 1 wherein X is hydrogen.

3. A compound as defined in claim 2 wherein R and R' are hydrogen.

4. A compound as defined in claim 2 wherein R and R' are lower alkyl.

5. A compound as defined in claim 4 wherein R and R' are ethyl.

6. A compound as defined in claim 4 wherein R is methyl and R' is ethyl.

7. A compound as defined in claim 1 wherein X is chlorine.

8. A compound as defined in claim 7 wherein R and R' are hydrogen.

9. A compound as defined in claim 7 wherein R and R' are lower alkyl.

10. A compound as defined in claim 9 wherein R and R' are ethyl.

* * * * *